(12) United States Patent
Akamatsu et al.

(10) Patent No.: US 6,304,454 B1
(45) Date of Patent: Oct. 16, 2001

(54) HOUSING DEVICE FOR SIM CARD

(75) Inventors: Koichi Akamatsu; Manabu Hasegawa, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,507

(22) Filed: Sep. 1, 2000

Related U.S. Application Data

(63) Continuation of application No. PCT/JP99/00517, filed on Feb. 5, 1999.

(51) Int. Cl.⁷ .............................. H05K 5/00; H05K 5/04; H05K 5/06
(52) U.S. Cl. .................. 361/752; 361/829; 361/730; 361/727; 361/816; 174/35 R
(58) Field of Search .................... 361/752, 726, 361/730, 739, 781, 800, 814, 816, 829, 727, 756, 809, 741, 725; 174/35 R

(56) References Cited

U.S. PATENT DOCUMENTS

| | | | | |
|---|---|---|---|---|
| 4,743,746 | * | 5/1988 | Murschall et al. | 235/486 |
| 5,224,873 | * | 7/1993 | Duffet et al. | 439/326 |
| 5,257,414 | * | 10/1993 | Trahan et al. | 455/90 |
| 5,505,628 | * | 4/1996 | Ramey et al. | 439/76.1 |
| 5,511,986 | * | 4/1996 | Casey et al. | 439/188 |
| 5,984,707 | * | 11/1999 | Kuwata | 439/326 |
| 6,102,743 | * | 8/2000 | Haffenden et al. | 439/630 |
| 6,106,317 | * | 8/2000 | Michaelis et al. | 439/326 |
| 6,129,558 | * | 10/2000 | Kihira et al. | 439/66 |

FOREIGN PATENT DOCUMENTS

| | | |
|---|---|---|
| 4172582 | 6/1992 | (JP) . |
| 834113 | 3/1996 | (JP) . |
| 10190803 | 7/1998 | (JP) . |
| 10336292 | 12/1998 | (JP) . |

* cited by examiner

Primary Examiner—Jeffrey Gaffin
Assistant Examiner—Hung Bui
(74) Attorney, Agent, or Firm—Rothwell, Figg, Ernst & Manbeck

(57) ABSTRACT

When a housing device for an SIM card 600 is equipped with a mobile telephone 500, a objection 420 pioviel on an operational lever 400 can be seen from a lever hole 511 provided in the housing 510. In this way, it is possible to slidably displace a cover 300 of the housing device of the SIM card 600 which is housed within by moving the projection 420 with a finger or the like. Furthermore an SIM card insertion/detachment aperture 512 provided in said housing 510 is positioned on an extension of a container 120 of a body 120 in the SIM card insertion/detachment device. When the SIM card 600 is inserted from the SIM card insertion/detachment aperture 512, the card may be contained in the container.

11 Claims, 7 Drawing Sheets

(D)

(A)

(B)

(C)

A > B

HOUSING DEVICE FOR SIM CARD

CROSS-REFERENCE TO THE RELATED APPLICATION

This application is a continuation of International Application No. PCT/JP99/00517, whose International filing date is Feb. 5, 1999, the disclosures of which Application are incorporated by reference herein.

BACKGROUND OF THE INVENTION

1. Field of the Invention

The present invention relates to a housing device for an SIM card which allows insertion or detachment of an SIM (subscriber identification module) card without the need to remove a battery.

2. Description of the Related Art

FIG. 13 is a perspective view of a conventional housing device for an SIM card. In the figure, reference numeral 500 denotes a mobile telephone, 512 is an SIM card removal mouth which is disposed in the housing of the mobile telephone 500 and is seen from the outside with the battery 520 removed. 520 is a battery which is removably mounted in the housing of a mobile telephone 500. 600 is an SIM card which is removably mounted in the housing of the mobile telephone 500.

The operation of the conventional housing device for an SIM card will be explained below.

An SIM card 600 used in a mobile telephone 500 is inserted/detached as shown in FIG. 13 by removing the battery 520 from the housing of the mobile telephone 500 to uncover an SIM card removal mouth 512 or contact device and then removing the SIM card 600 therefrom. When in the contact device, the SIM card carries a charge. Therefore if "hotline connection/disconnection" is performed by removing or inserting the SIM card while carrying a charge, there is the danger of damage to the circuit or the SIM card. As a result, the insertion or detaching of an SIM card is performed after disconnecting the battery.

Since the conventional example of an SIM card housing device is constructed as above, it is necessary to perform the operation of removing the battery 520 during insertion/detachment of the SIM card 600. Thus for example, the problem has arisen that it is necessary perform the difficult operation of holding the battery 520 in one hand and inserting/detaching the SIM card 600 when there is no place in which to place the battery 520. Furthermore the problem has arisen that design freedom is limited as a result of the fact, that the positioning of the contact device of the SIM card 600 is limited to the periphery of the battery 520.

SUMMARY OF THE INVENTION

The present invention is proposed to solve the above problems and has the object of providing a housing device for an SIM card 600 which allows an increase in design freedom by allowing the insertion and removal of the SIM card 600 by cutting the current when the SIM card 600 is inserted/detached without the need to remove the battery 520.

A housing device for an SIM card 600 according to the present invention comprises a body formed from an insulating material, and formed with a container for accommodating an SIM card 600, a detection means which determines whether or not an SIM card 600 is accommodated in a fixed position in the container, a cover provided with an engaging means of an SIM card 600 for the insertion/detachment of the SIM card 600, and an operational lever. The SIM card 600 is inserted into or detached from the housing by the operation of the operational lever. The supply of current to the SIM card 600 is controlled on the basis of the operational state of the detection means.

In this way, when inserting/detaching the SIM card, it is possible to insert/detach the card safely without removing the battery since the current in the connector is cut by the detection means. Thus it is possible to fix a battery in the housing. This arrangement allows reductions in size and number of components in the device. Furthermore advantages in design and outlay of the device are achieved since the position in which the contact device of the SIM card is housed may be freely determined without reference to the position of the battery.

The housing device for an SIM card according to the present invention is provided with a detecting means for detecting an inserted or detached state of an SIM card in the body, which detecting means is integrally formed with the body.

In this way, occupied space may be reduced and since the device is integrated, detection errors due to the layout are reduced. Furthermore it is possible to reduce the number of components.

The housing device for an SIM card according to the present invention is adapted to make the SIM card detachable by sliding in the direction of insertion/detachment by provision of an operational lever formed on a cover.

Thus the device may be formed in a thin small arrangement which does not occupy a large space.

The housing device for an SIM card according to the present invention is provided with a lever hole formed in the housing for allowing protrusion of the operational lever and a removal mouth for allowing insertion and detachment of the SIM card. The device is adapted to move the operational lever which has protruded from the housing and to insert/detach the SIM card from the removal mouth.

In this way, the opening operation of a cover or the like when inserting/detaching the SIM card in a conventional cover-type device may be avoided. Thus the device of the present invention may be simply operated only by the operation lever.

The housing device for an SIM card according to the present invention is provided with a hook on the cover which removes the SIM card and which is provided with the dual functions of removing and of fixing the SIM card.

Thus it is not necessary to provide a component separately to the cover in order to remove the SIM card. This allows a reduction in the number of components and assembly operations.

In a housing device for an SIM card according to the present invention, the detection means is provided with a first and a second contact formed from a flexible member. One end of the first contact is fixed to power source wiring formed on the base. The other end contacts with one end of the second contact. The other end of the second contact is connected to a contact detection means which detects a state of connection between the first and second contact.

Thus a detection means is comprised by only the provision of two contacts in the body. Since other separate components and a large occupied space are not necessary, the device may be formed in a thin small shape with a reduced number of components.

In the housing device for an SIM card according to the present invention, one end of a second contact and the other end of a first contact mutually contact when an SIM card is not housed. The contacts detection device is adapted to detect that the SIM card is housed, when the connection of the other end of the first contact with one end of the second contact is cut.

Thus it is possible to accurately perform detection of whether the SIM card is housed or not by the direct connection of the contacts being severed by the insertion of an SIM card. Furthermore since the SIM card is often housed during use, placing the contacts in a non-contacting state makes it possible to reduce electricity consumption.

In the housing device for an SIM card according to the present invention, a door is mounted on the SIM card removal mouth of the housing and a door opening detection means is provided which detects an open or closed state of the door when an SIM card is inserted or detached.

Thus it is possible to insert/detach an SIM card without problems since the fact that the door is opened is detected before insertion/detachment. Thus it is possible for the door to prevent the SIM card from detaching and falling out.

In the housing device for an SIM card according to the present invention, the contact of one end of a second contact and another end of a first contact is severed when an SIM card is not housed. When an SIM card is housed, one end of a second contact and another end of a first contact come into contact and thus the insertion of the SIM card is detected by the contact detection means.

Thus when the logic of the detection circuit is in an inverted state, that is to say, in the case where power consumption is lower when the contacts are in connection when the SIM card is housed, it is not necessary to invert the logic state by additional components. Furthermore it is possible to prevent an increase in power consumption and in the number of components.

In the housing device for an SIM card according to the present invention, the cover is formed from the same material as the operational lever, for example resin, and the cover and operational lever are integrated.

Thus it is possible to reduce the number of components since a cover which includes the function of an operational lever is provided as a single component.

In the housing device for an SIM card according to the present invention, one end of a contact which is a detection terminal is switched between a contact and non-contact state by the movement of the operational lever resulting in the detection of the insertion/detachment of the SIM card.

Thus even when the housing region in which the SIM card is directly detected is not defined, the disposition of contacts in the periphery achieves the same function. Thus the danger of damaging the SIM card is eliminated as the SIM card does not come into direct contact with the detection terminal.

DETAILED DESCRIPTION OF THE PREFERRED EMBODIMENTS

In order to explain the invention in greater detail, the preferred embodiments of the invention are outlined below with reference to the accompanying figures.

Embodiment 1

Figure 1:
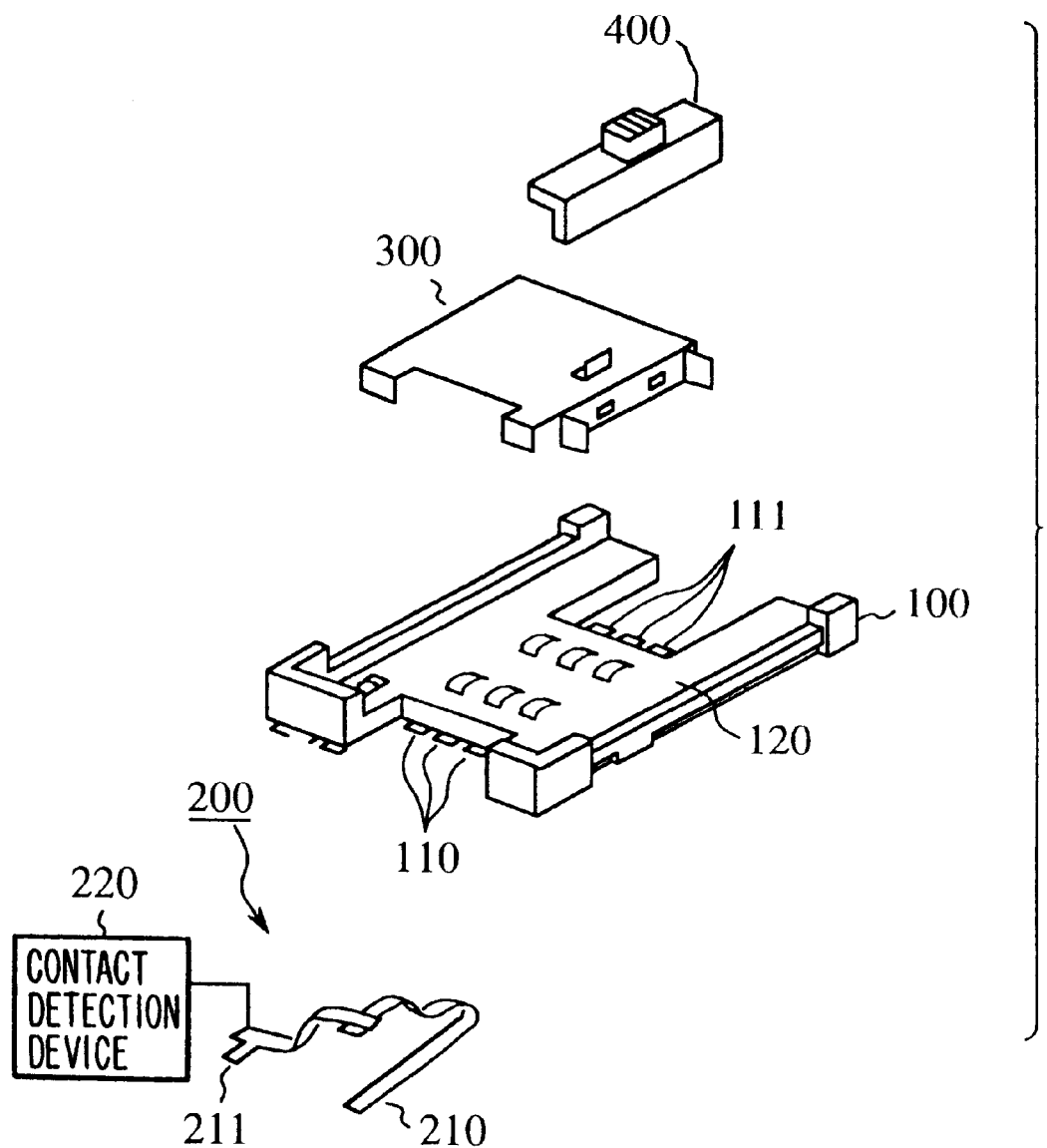
FIG. 1 is a perspective view showing a schematic structure of a housing device for an SIM card according to a first embodiment of the present invention.
Figure 2:
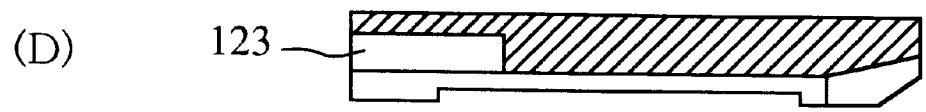
FIG. 2 is a view of a body in a housing device for an SIM card according to a first embodiment of the present invention where (A) is a schematic upper view, (B) is a schematic front view, (C) is a schematic lower view, (D) is a cross sectional schematic view of (A) along the line I—I.
Figure 2:
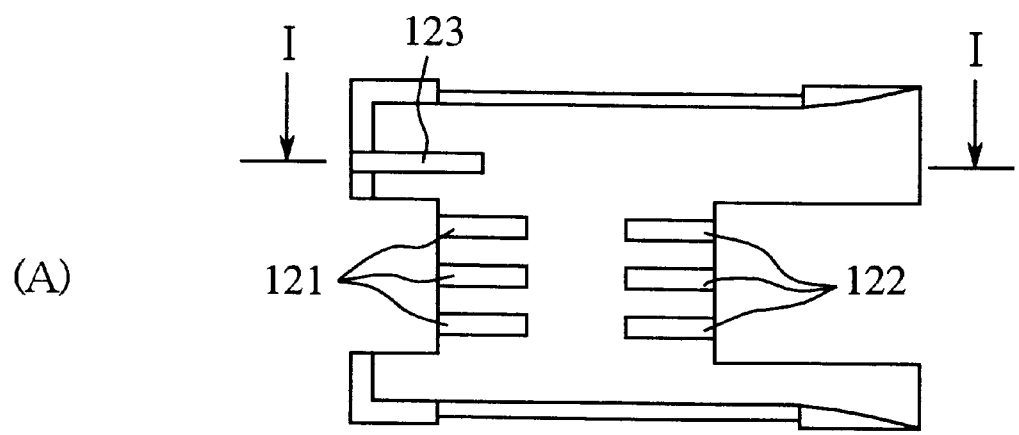
Figure 2:
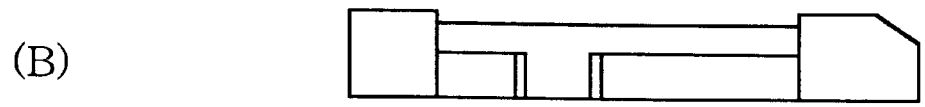
Figure 2:
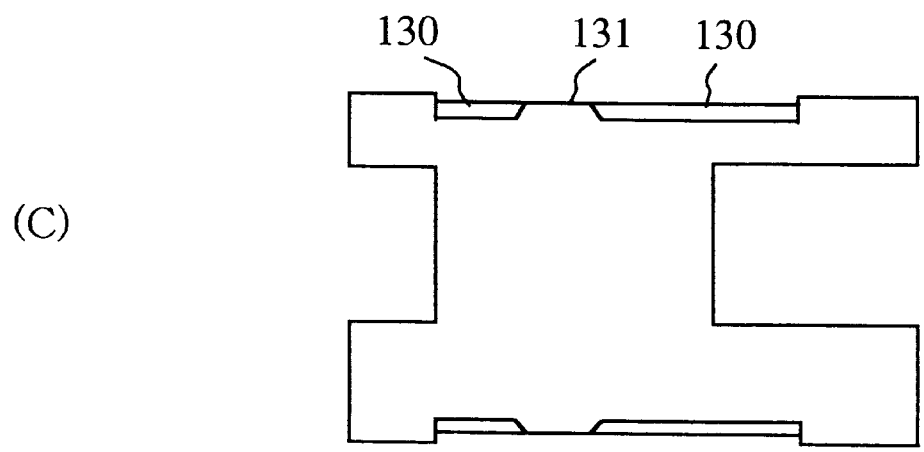
Figure 4:
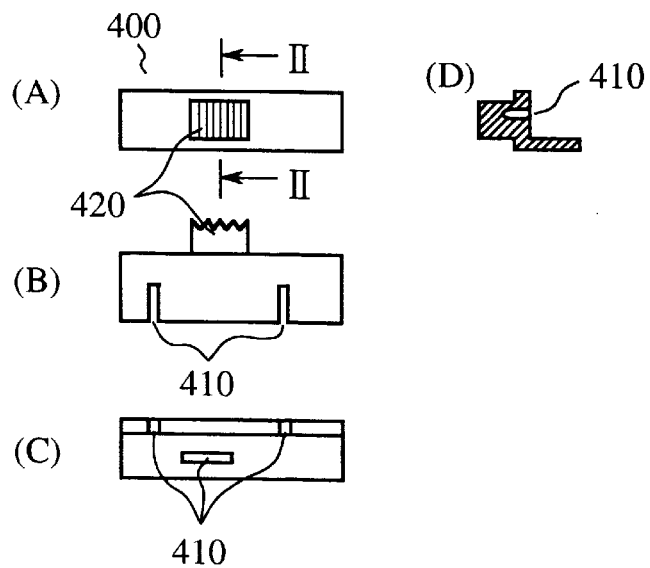
FIG. 4 is a view of an operation lever in a housing device for an SIM card according to a first embodiment of the present invention where A) is a schematic upper view, (B) is a schematic front view, (C) is a schematic lower view, (D) is a cross sectional schematic view of (A) along the line II—II.

FIG. 1 is a perspective view showing a schematic structure of a housing device for an SIM card according to a first embodiment of the present invention. FIG. 2 is a view of a body in a housing device for an SIM card according to a first embodiment of the present invention. (A) is a schematic upper view, (B) is a schematic front view, (C) is a schematic lower view, (O) is a cross sectional schematic view of (A) along the line I—I. FIG. is a view of a cover in a housing device for an SIM card according to a first embodiment of the present invention. A) is a schematic upper view, (B) is a schematic front view, (C) is a schematic lower view, (D) is a schematic lateral view. FIG. 4 is a view of an operation lever in a housing device for an SIM card according to a first embodiment of the present invention. A) is a schematic upper view, (B) is a schematic front view, (C) is a schematic lower view, (D) is a cross sectional schematic view of (A) along the line II—II.

In the figures, 100 is a body formed from an insulating material which forms a container which contains the SIM card 600. 200 is a detection means which determines whether or not the SIM card 600 is stored in a fixed position in the container. 300 and 400 respectively denote a cover and an operation lever which are provided with an engaging means with the SIM card 600 to allow insertion/detachment of the SIM card 600. The SIM card 600 is inserted/detached from the body 100 by the operation of the operation lever 400 and the supply of electricity to the SIM card 600 is controlled by the detection means 200.

The body of the housing device of the SIM card 600 is formed from synthetic resin which has an insulating quality such as ABS. The body 100 is formed from a rectangular container 120 adapted to the outer shape of the SIM card 600, slits 121, 122 which dispose terminals 110, 111 for the SIM card 600 and a slit 123 which disposes the detection means 200 which detects the insertion or detachment of the SIM card 600.

The terminals 110, 111 for the SIM card 600 are inserted into the slits 121, 122. When an SIM card 600 is inserted/detached the slits 121, 122 are parallel to the direction of sliding. The two contacts 210, 211 which detect the card are inserted into the slit 123.

The detection means 200 is provided with first and second contacts 210, 211 which are formed by an elastic member. One end of the contact 210 is formed on the base 700 (refer to FIG. 7) and is fixed to the power source wiring (not shown). The other end connects with an end of the contact 211. The other end of the contact 211 is connected to the contact detection device 220 which detects a state of contact between the contact 210 and the contact 211.

The cover 300 of the detachable device for the SIM card 600 is formed by a metal plate such as sheet metal. A projection 310 provided on the cover 300 which engages with the body is inserted into the cover engaging groove 130 on the body 100. In this way, the cover 300 is inserted into the body 100. Furthermore the cover 300 is formed to be slidable parallel with respect to the body in the direction of sliding when the SIM card 600 is inserted/detached. Furthermore it is possible to stop the cover 300 at a position opposite the removal mouth 512 for the SIM card 600 when the cover 300 is slidably displaced. That is to say when the SIM card 600 is housed, the cover 300 is adapted to stop when the innermost section is completely housed.

A hook 312 which is provided on the cover 300 is formed to hook the SIM card 600. The cover 300 has the dual role of drawing the SIM card 600. The projection 311 engaging with the operational lever provided on the cover 300 is inserted into the cover insertion groove on the operational lever 400. In this way, the operational lever 400 engages with the cover 300 and the cover 300 can slide together with the operational lever 400 due to the operation of the projection 420 provided on the operation lever 400. On the other hand, a lever hole 511 through which the operational level 400 is protruded and a SIM card removal mouth 512 are provided on the housing of the mobile telephone 500.

The operation of the housing device according to the present invention will be discussed below.

Figure 5:
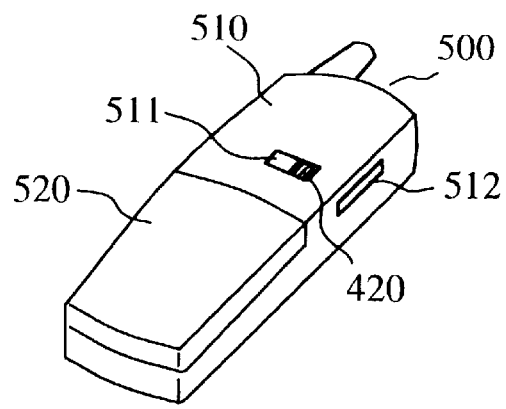
FIG. 5 is a perspective view of a mobile telephone equipped with a housing device for an SIM card according to a first embodiment of the present invention.
Figure 6:
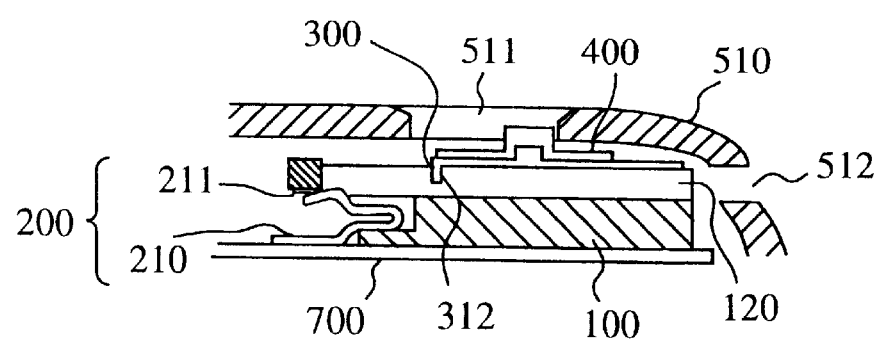
FIG. 6 is a schematic cross section of a housing device for an SIM card incorporated in a mobile telephone according to a first embodiment of the present invention.
Figure 7:
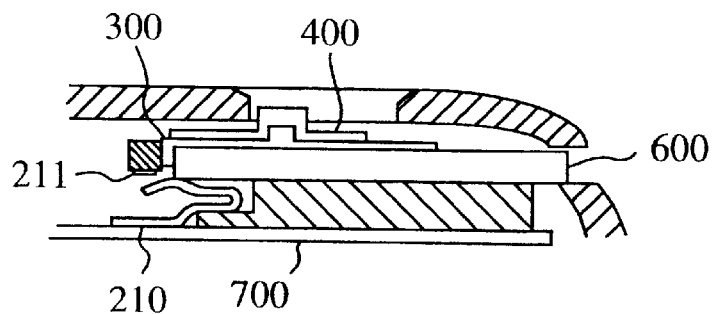
FIG. 7 is a schematic cross section of a housing device for an SIM card incorporated in a mobile telephone with an SIM card housed according to a first embodiment of the present invention.

FIG. 5 is a perspective view of a mobile telephone equipped with a housing device for an SIM card according to a first embodiment of the present invention. FIG. 6 is a schematic cross section of a housing device for an SIM card incorporated in a mobile telephone according to a first embodiment of the present invention. FIG. 7 is a schematic cross section of a housing device for an SIM card according to a first embodiment of the present invention incorporated in a mobile telephone, with an SIM card housed therein.

As shown by FIG. 5, when a housing device for a SIM card 600 is provided in a mobile telephone 500, a projection 420 provided on the operational lever 400 can be seen from the lever hole 511 provided on the housing 510. In this way, it is possible for the cover 300 of the housing device of the SIM card 600 housed in the interior to slide by moving the projection 420 with a finger or the like. Furthermore the removal mouth 512 for a SIM card 600 provided on the housing 510 is disposed on the extension of the container 120 of the body 100 in the housing device of the SIM card 600. When the SIM card 600 is inserted from the removal mouth 512 of the SIM card 600, the removal mouth 512 is adapted to be fully accommodated in the container.

As shown in FIG. 6, a detection means 200 is provided on the left side of the body 100 which forms the insertion/detachment device of the SIM card 600 in a first embodiment of the present invention as seen from FIG. 6. That is to say, the detection means is provided on a section which corresponds to the innermost section when the SIM card 600 is housed. One end of the contact 211 and the other end of the contact 210 ale in mutual contact due to spinning pressure as shown in FIG. 6 when an SIM card 600 is not housed. When an SIM card 600 is housed, as shown in FIG. 7, one end of the contact 211 and the other end of the contact 210 are detached being pushed down by the SIM card 600. At this time, the contact detection means 220 detects the housing of the SIM card 600.

When an SIM card 600 is removed, the hook 312 which is provided on the cover 300 which displaces together with the operational lever 400 draws the SIM card 600 out by the operational lever 400 being operated by a finger or the like. Thus the SIM card 600 can be easily drawn out from the SIM card removal mouth 512. At this time, the contact 210 is placed in contact once more with the contact 211 by the spinning force. The contact detection means 220 detects the removal of the SIM card 600 and the current between the contacts 210, 211 is immediately severed.

Thus when the SIM card 600 is inserted/detached and a current exists with the SIM card terminals 110, 111, "hot line connection/disconnection" does not occur and the insertion/detachment may be safely and easily performed.

Furthermore an SIM card 600 in a housing device above directly pushes the contact 210 down. However the SIM card housing device of the present invention is not limited in this respect. For example, it is possible to provide a detection means which detects movement of the operational lever 400 or the cover 300 which are formed in the SIM card housing device. In this way, the terminal does not directly contact with the SIM card 600 and any damage to the SIM card 600 is prevented as a result.

Embodiment 2

Figure 8:
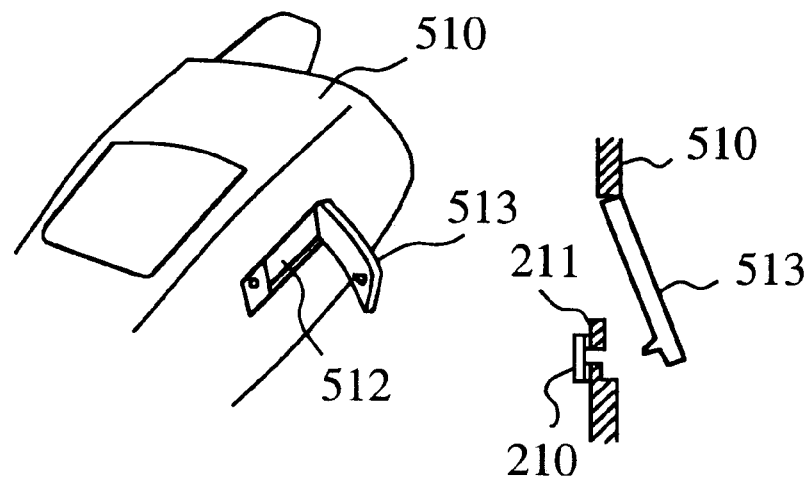
FIG. 8 is a perspective and cross sectional view showing the door of the SIM card removal mouth which is provided in the housing in a housing device for an SIM card according to a first embodiment of the present invention.
Figure 9:
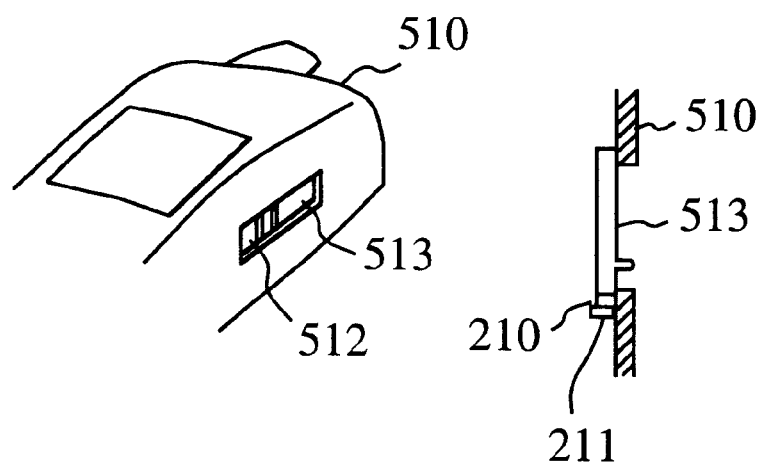
FIG. 9 is a perspective and cross sectional view showing a door of another SIM card removal mouth which is provided in the housing in a housing device for an SIM card according to a second embodiment of the present invention.

FIG. 8 is a perspective and cross sectional view showing the door of the SIM card removal mouth in the housing device for an SIM card, which is provided in the housing side of the telephone according to a first embodiment of the present invention. FIG. 9 is a perspective and cross sectional view showing a door of another SIM card removal mouth in the housing device for an SIM card, which is provided with the housing side of the telephone according to a second embodiment of the present invention.

Figure 10:
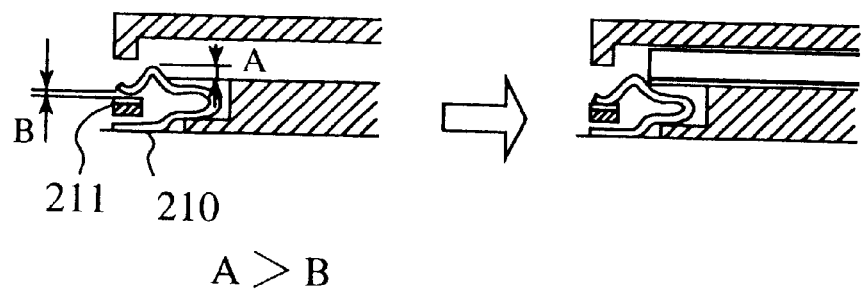
FIG. 10 is an explanatory view of an insertion/detachment detection contact for an SIM card in an SIM card housing device according to a second embodiment of the present invention.
Figure 11:
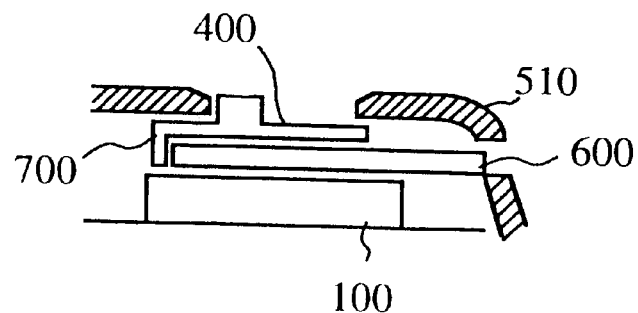
FIG. 11 is a lateral view of a cover integrated with an operational lever in a housing device for an SIM card according to a second embodiment of the present invention.
Figure 12:
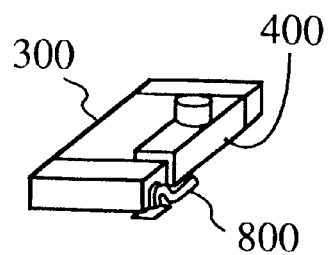
FIG. 12 is an explanatory view of an insertion/detachment detection terminal for an SIM card in a housing device for an SIM card according to a second embodiment of the present invention.
Figure 13:
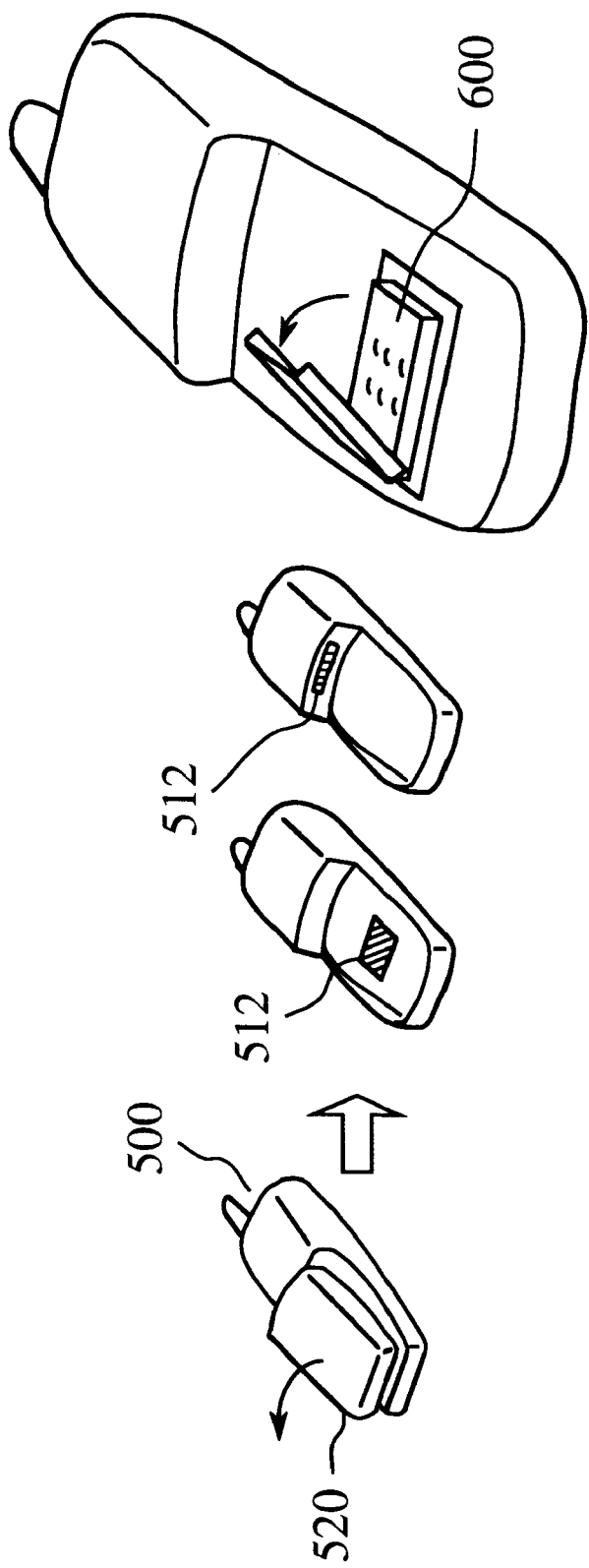
FIG. 13 is a perspective view of a conventional housing device for an SIM card.

FIG. 10 is an explanatory view of an insertion/detachment detection contact for an SIM card in an SIM card housing device according to a second embodiment of the present invention. FIG. 11 is a lateral view of a cover integrated with an operational lever in an SIM card housing device for an SIM card according to a second embodiment of the present invention. FIG. 12 is an explanatory view of an insertion/detachment detection terminal for an SIM card in an SIM card housing device according to a second embodiment of the present invention.

As shown in FIG. 8, a door 513 is disposed on the SIM card removal mouth 512 of the housing 510. It is possible to carry out detection when the door 513 is opened during the insertion or detachment of a SIM card 600 by the provision of means which detects the opening or closure of the door 513. The door 513 may be of a sliding type as shown in FIG. 9 or an opening/closing type as shown in FIG. 8.

The operation of the housing device according to the present invention will be discussed below.

Figure 3:
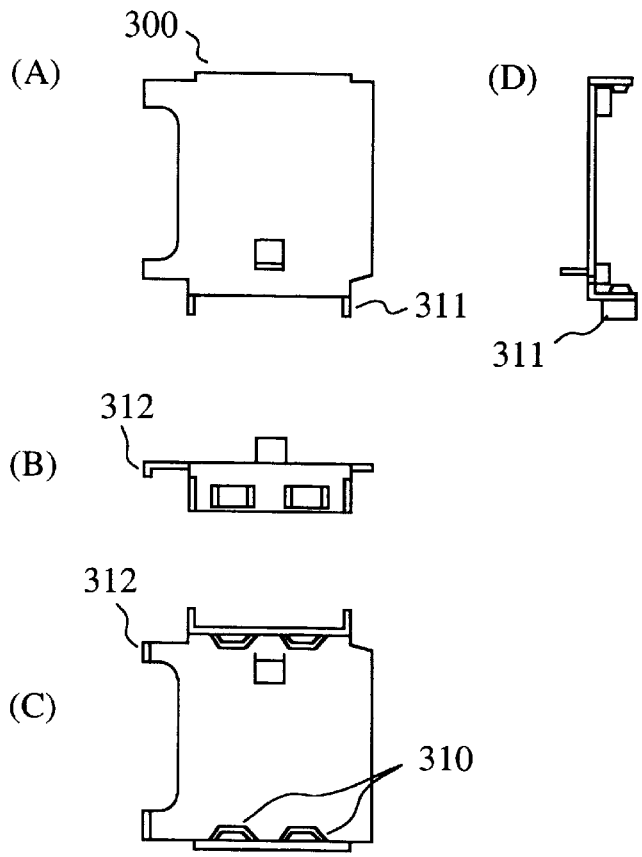
FIG. 3 is a view of a cover in a housing device for an SIM card according to a first embodiment of the present invention where A) is a schematic upper view, (B) is a schematic front view, (C) is a schematic lower view, (D) is a schematic lateral view.

In an SIM card housing device as shown in FIG. 2 and FIG. 3, the cover 300 is adapted to create a clicking sensation when sliding by the provision of a projection 310 engaging with the body which is provided on the cover 300, a groove 130 engaging with the cover 300 provided on the body 100 and a groove projection 131. Furthermore the connection between one end of the contact 211 and the other end of the contact 210 of the detection means 200 shown in FIG. 10 is severed when a SIM card 600 is not housed. When an SIM card 600 is housed, the contact between one end of the contact 211 and the other end of the contact 210 of the detection means 200 shown in FIG. 10 is established. The contact detection means 220 detects whether an SIM card 600 is housed or not. Furthermore it is possible to create a clicking sensation when the SIM card 600 is housed due to the elasticity of the contact 210.

The cover 300 is formed by a metal plate in the SIM card housing device above. However if the invention is adapted so as to produce the clicking sensation with a terminal 210 for example rather than the cover, it is possible to form the cover 300 in resin. In this case, it is possible to reduce the number of components by integration with the operational lever 400.

The cover 500 shown in FIG. 11 is formed from the same material, for example resin, as the operation lever 400 and the cover 300 and the operational lever 400 may thus be integrated.

One end of the detection terminal 800 shown in FIG. 12 is switched between contract and non-contact, by the movement of the operational lever 400 and detects the insertion or detachment of the SIM card.

As shown above, a housing device for an SIM card according to the present invention increases the freedom of positioning an SIM card and is adapted to enable the insertion and detachment of the SIM card without removing a battery of a mobile telephone.

What is claimed is:

1. A housing device for an SIM card comprising:
   a body formed from an insulating material and forming a container for accommodating the SIM card therein;
   a detection means determining whether or not the SIM card is housed in a fixed position in said container;
   a cover provided with an engagement means engaging with the SIM card in order to insert or detach the SIM card; and
   an operational lever,
   wherein the SIM card may be inserted into and detached from a housing by operation of said operational lever, and electricity supplied to the SIM card is controlled according to the operational condition of said detection means.

2. A housing device for an SIM card according to claim 1, further comprising a detection means for detecting an inserted or detached state of an SIM card in said body, said detection means being integrally formed with said body.

3. A housing device for an SIM card according to claim 1, wherein the SIM card is enabled to insert and detach by sliding in a detaching direction due to an operation lever formed on said cover.

4. A housing device for an SIM card according to claim 1, further comprising a lever hole formed in a housing for allowing extrusion of said operational lever and a removal mouth which allows insertion and detachment of the SIM card, wherein movement of said operational lever, said lever protruded from said housing allows insertion and detachment of the SIM card from said insertion/detachment hole.

5. A housing device for an SIM card according to claim 1, wherein a hook drawing the SIM card is provided on said cover, said hook having both functions of fixing the SIM card and drawing the SIM card.

6. A housing device for an SIM card according to claim 1, further comprising a detection means provided with a first contact and a second contact formed from an elastic member, one end of said first contact being formed on a base and fixed to power source wiring, another end being in connection with one end of said second contact, the other end of said second contact being connected to a contact detection means detecting the state of connection between said first contact and said second contact.

7. A housing device for an SIM card according to claim 6, wherein when the SIM card is not housed, one end of said second contact and another end of said first contact mutually connect, and when the SIM card is housed and the connection between one end of said second contact and another end of said first contact is severed, said contact detection means detects that the SIM card is inserted.

8. A housing device for an SIM card according to claim 1, wherein a door is mounted on the SIM card removal mouth in said housing and a door opening detection means is provided for detecting the open or closed position of said door when an SIM card is inserted or detached.

9. A housing device for an SIM card according to claim 6, wherein when the SIM card is not housed, the contact of one end of said second contact and another end of said first contact is severed and when the SIM card is housed, and one end of said second contact and another end of said first contact mutually connect, said contact detection means detects that the SIM card is inserted.

10. A housing device for an SIM card according to claim 1, wherein said cover is formed from the same material as said operational lever and said cover and said operational lever are integrated.

11. A housing device for an SIM card according to claim 6, wherein one end of a contact is a detection terminal that detects the insertion or detachment of a SIM card by switching a contact and non-contact state due to the movement of an operational lever.

* * * * *

UNITED STATES PATENT AND TRADEMARK OFFICE
CERTIFICATE OF CORRECTION

PATENT NO. : 6,304,454 B1
DATED : October 16, 2001
INVENTOR(S) : Koichi Akamatsu et al.

It is certified that error appears in the above-identified patent and that said Letters Patent is hereby corrected as shown below:

Column 4,
Line 55, change "(O)" to -- D --,
Line 56, insert -- 3 -- after "FIG.", Column 6,
Line 21, "ale" should be -- are --,
Line 21, "spinning" should be -- spring -- and Column 7,
Line 39, "500" should be -- 700 --.

Signed and Sealed this

Twenty-first Day of January, 2003

JAMES E. ROGAN
*Director of the United States Patent and Trademark Office*